(12) United States Patent
Shiroishi et al.

(10) Patent No.: US 7,807,261 B2
(45) Date of Patent: Oct. 5, 2010

(54) TRANSPARENT CONDUCTIVE LAMINATE AND TRANSPARENT TOUCH PANEL COMPRISING THE SAME

(75) Inventors: Isao Shiroishi, Hino (JP); Haruhiko Ito, Hino (JP); Hitoshi Mikoshiba, Hino (JP)

(73) Assignee: Teijin Limited, Osaka (JP)

( * ) Notice: Subject to any disclaimer, the term of this patent is extended or adjusted under 35 U.S.C. 154(b) by 1167 days.

(21) Appl. No.: 10/580,341

(22) PCT Filed: Nov. 25, 2004

(86) PCT No.: PCT/JP2004/017893

§ 371 (c)(1),
(2), (4) Date: May 25, 2006

(87) PCT Pub. No.: WO2005/052956

PCT Pub. Date: Jun. 9, 2005

(65) Prior Publication Data

US 2009/0002323 A1    Jan. 1, 2009

(30) Foreign Application Priority Data

Nov. 28, 2003   (JP) .............................. 2003-398704

(51) Int. Cl.
*B32B 27/32* (2006.01)
*B32B 5/16* (2006.01)
*B32B 18/00* (2006.01)
(52) U.S. Cl. .................... 428/323; 428/220; 428/328; 428/329; 428/330; 428/331; 428/332; 428/339; 428/325; 428/326

(58) Field of Classification Search .................. None
See application file for complete search history.

(56) References Cited

U.S. PATENT DOCUMENTS

| 6,495,253 B1 | 12/2002 | Koyama et al. |
| 6,613,426 B2 | 9/2003 | Onozawa et al. |
| 6,937,230 B2 | 8/2005 | Hatakeda et al. |

FOREIGN PATENT DOCUMENTS

| EP | 1 426 174 A1 | 6/2004 |
| JP | 6-218864 A | 8/1994 |
| JP | 8-216327 A | 8/1996 |
| JP | 9-234817 A | 9/1997 |
| JP | 10-323931 A | 12/1998 |
| JP | 2001-84839 A | 3/2001 |
| JP | 2002-36452 A | 2/2002 |
| JP | 2002-373056 A | 12/2002 |
| WO | WO 03/020509 A1 | 3/2003 |

*Primary Examiner*—Sheeba Ahmed
(74) *Attorney, Agent, or Firm*—Sughrue Mion, PLLC (57) ABSTRACT

A transparent conductive laminate consisting of a transparent polymer substrate, an uneven cured resin layer formed on at least one side of the substrate and a transparent conductive layer formed on the cured resin layer directly or through another layer. The cured resin layer contains fine particles A having an average primary particle diameter of 0.5 to 5 μm and super fine particles C having an average primary particle diameter of 100 nm or less made of a metal oxide and/or a metal fluoride. The above transparent conductive laminate does not cause the deterioration of visibility by sparkling even when a transparent touch panel is mounted on a high-definition display and can prevent "Newton rings" which occurs between two transparent electrode substrates constituting the transparent touch panel.

10 Claims, 2 Drawing Sheets

TRANSPARENT CONDUCTIVE LAMINATE AND TRANSPARENT TOUCH PANEL COMPRISING THE SAME

TECHNICAL FIELD

The present invention relates to a transparent touch panel and a transparent conductive laminate suitable for use in the same. More specifically, it relates to a transparent touch panel having excellent visibility and a transparent conductive laminate for use in the same.

BACKGROUND ART

In recent years, transparent touch panels for realizing an interactive input system have been widely used as one of man-machine interfaces. Transparent touch panels are divided into optical, ultrasonic, capacitance and resistant film types according to position detection method. Out of these, resistant film type transparent touch panels are becoming popular rapidly because they have a simple structure and a high cost/performance ratio.

A resistant film type transparent touch panel is an electronic part which is composed of two films or sheets having a transparent conductive layer on their opposed sides with a predetermined space therebetween. A movable electrode substrate (electrode substrate on a viewer side) is depressed with a pen or finger to be warped and brought into contact and conductive with a fixed electrode substrate (electrode substrate on the opposite side) so as to detect the position of a detection circuit and make a predetermined input. At this point, interference fringes called "Newton rings" may appear in a depressed portion. Even when the electrode substrate is not depressed, "Newton rings" may appear in a narrow space between the movable electrode substrate and the fixed electrode substrate by a warp of the movable electrode substrate. The visibility of a display is reduced by the occurrence of the "Newton rings". To suppress "Newton rings" which occurs between the two transparent electrode substrates constituting the resistant film type transparent touch panel, JP-A 10-323931 discloses a method of forming a coating layer containing a predetermined amount of a filler having an average primary particle diameter of 1 to 4 μm and a transparent conductive layer on aplastic film. JP-A2002-373056 discloses a method of forming a protrusion coating layer containing silica particles having an average secondary particle diameter of 1.0 to 3.0 μm (coating layer having protrusions) on a plastic film.

In the case of a transparent touch panel comprising a transparent conductive laminate consisting of a plastic film, a coating layer containing particles having an average primary particle diameter or secondary particle diameter in micron order and a transparent conductive layer, both formed on the plastic film, the occurrence of "Newton rings" is reduced. However, when the transparent touch panel is mounted on a high-definition display of nowadays, a resin around the particles contained in the coating layer provides a lens effect, thereby causing the color separation (sparkling) of light from the display and greatly deteriorating the visibility of the display.

As a coating layer for suppressing "Newton rings" other than the above, JP-A 2001-84839 discloses an anti-Newton rings layer which comprises at least two matting agents having different average particle diameters and a binder resin. Although the anti-Newton rings layer formed by this method can suppress sparkling on a high-definition display, particles having different average particle diameters of 1 to 15 μm and 5 to 50 nm are added for matting. When fine particles having an average particle diameter of 5 to 50 nm are added to a binder resin, haze does not occur as the particle diameter is much smaller than the visible light wavelength. From comparison between Examples and Comparative Examples of JP-A 2001-84839, it is presumed that the particles form a secondary agglomerate as the haze value is increased by the addition of the fine particles having an average particle diameter of 5 to 50 nm. It is understood that sparkling is controlled by this rise in haze value, that is, matting. Since the anti-Newton rings layer formed by this method has an extremely large haze value, it deteriorates the visibility of a display.

Further, JP-A 2002-36452 discloses an anti-glare hard coat film comprising a plastic film and a hard coat layer containing a curable resin which is cured by the irradiation of ionizing radiation, silica particles having an average particle diameter of 0.5 to 5 μm and fine particles having an average particle diameter of 1 to 60 μm formed on the plastic film. The purpose of the hard coat layer is to prevent the glare of reflected light from the surface of the hard coat. JP-A 2002-36452 is utterly silent about the method of preventing the sparkling depending on color separation of light from a display and the method of preventing "Newton rings" which occurs between a movable electrode substrate and a fixed electrode substrate, both of which are objects of the present invention.

DISCLOSURE OF THE INVENTION

The inventors of the present invention have conducted intensive studies on the above problems in the current situation and have succeeded in controlling the unevenness of the surface of a curable resin layer by adding super fine particles C having an average primary particle diameter of 100 nm or less to a curable resin layer containing fine particles A having an average primary particle diameter of 0.5 to 5 μm so as to suppress the occurrence of "Newton rings" and further the deterioration of visibility caused by sparkling.

It is an object of the present invention to provide a transparent conductive laminate for use in a transparent touch panel, which does not cause the deterioration of visibility by sparkling even when the transparent touch panel is mounted on a high-definition display and can prevent "Newton rings" which occurs between two transparent electrode substrates constituting the transparent touch panel.

It is another object of the present invention to provide a transparent conductive laminate having a small haze value while retaining the above visibility.

It is still another object of the present invention to provide a new transparent touch panel comprising the above transparent conductive laminate.

To solve the above problems, the inventors of the present invention have found that the leveling state of a curable resin layer is changed surprisingly by adding super fine particles C of a metal oxide or fluoride having an average primary particle diameter of 100 nm or less to a mixture of at least one type of fine particles A having an average primary particle diameter of 0.5 to 5 μm and a curable resin, thereby making it possible to freely control the unevenness of the surface of the curable resin layer. The present invention has been accomplished based on this finding. That is, the present invention is as follows.

A first invention is a transparent conductive laminate comprising a transparent polymer substrate, an uneven cured resin layer-1 formed on at least one side of the substrate and a transparent conductive layer formed on the cured resin layer-1 directly or through another layer, wherein (A) the cured resin layer-1 comprises (i) a curable resin component, (ii) at least one type of fine particles A having an average primary particle diameter of 0.5 to 5 μM and (iii) super fine particles C having an average primary particle diameter of 100 nm or less made of at least one selected from the group consisting of a metal oxide and a metal fluoride;

(B) the content of the fine particles A in the cured resin layer-1 is 0.3 part or more by weight and less than 1.0 part by weight based on 100 parts by weight of the curable resin component (i);

(C) the content of the super fine particles C in the cured resin layer-1 is 1 to 20 parts by weight based on 100 parts by weight of the curable resin component (i);

(D) the thickness of the cured resin layer-1 is 0.5 to 5 μm; and (E) the haze value defined by JIS K7136 based on the transparent polymer substrate and the cured resin layer-1 is 1% or more and less than 8%.

A second invention is a transparent touch panel comprising two transparent electrode substrates having a transparent conductive layer on at least one side, which are arranged such that the transparent conductive layers are opposed to each other, wherein at least one of the transparent electrode substrates is the transparent conductive laminate of the present invention.

According to the present invention, as described above, there are obtained (1) a transparent conductive laminate which prevents the deterioration of the visibility of a display caused by sparkling and "Newton rings" which occurs between two transparent electrode substrates constituting a transparent touch panel by using a curable resin component and two different types of fine particles having different and specific particle diameters in a predetermined ratio to form an uneven cured resin layer constituting the transparent conductive laminate and which has a small haze value and excellent transparency and (2) a transparent touch panel comprising the same.

BEST MODE FOR CARRYING OUT THE INVENTION

Preferred embodiments of the present invention will be described hereinunder.

The uneven cured resin layer-1 in the present invention comprises a curable resin component, at least one type of super fine particles A having an average primary particle diameter of 0.5 to 5 μm and super fine particles C having an average primary particle diameter of 100 nm or less made of a metal oxide or a metal fluoride. The curable resin component is, for example, an ionizing radiation curable resin or a thermosetting resin.

The ionizing radiation curable resin can be obtained by polymerizing a monofunctional or polyfunctional acrylate such as polyol acrylate, polyester acrylate, urethane acrylate, epoxy acrylate, modified styrene acrylate, melamine acrylate or silicon-containing acrylate.

Preferred examples of the monomer include polyfunctional monomers such as trimethylolpropane trimethacrylate, trimethylolpropane ethylene oxide modified triacrylate, trimethylolpropane propylene oxide modified triacrylate, ethylene oxide isocyanurate modified triacrylate, pentaeryhtritol triacrylate, dipentaerythritol hexaacrylate, dimethyloltricyclodecane diacrylate, tripropylene glycol triacrylate, diethylene glycol diacrylate, 1,6-hexanediol diacrylate, epoxy modified acrylate and urethane modified acrylate. They may be used alone or in combination of two or more. As the case may be, a suitable amount of a hydrolyzate of an alkoxysilane may be added to the above acrylates. In the case of polymerization by ionizing radiation, a suitable amount of a known photopolymerization initiator is preferably added, and a suitable amount of an optical sensitizer may also be added as required.

Examples of the photopolymerization initiator include acetophenone, benzophenone, benzoin, benzoylbenzoate and thioxanthones. Examples of the optical sensitizer include triethylamine and tri-n-butylphosphine.

Examples of the thermosetting resin include organosilane-based thermosetting resins obtained by polymerizing a silane compound such as methyltriethoxysilane or phenyltriethoxysilane as a monomer, melamine-based thermosetting resins obtained by polymerizing an etherified methylolmelamine as a monomer, isocyanate-based thermosetting resins, phenol-based thermosetting resins and epoxy-based thermosetting resins. These thermosetting resins may be used alone or in combination of two or more. A suitable amount of a known reaction accelerator or curing agent is preferably used for thermal polymerization or crosslinking.

Examples of the reaction accelerator include triethylenediamine, dibutyltin dilaurate, benzylmethylamine and pyridine. Examples of the curing agent include methylhexahydrophthalic anhydride, 4,4'-diaminodiphenylmethane, 4,4'-diamino-3,3'-diethyldiphenylmethane and diaminodiphenylsulfone.

The cured resin layer-1 can achieve sufficiently high adhesion to the transparent conductive layer even when only the above curable resin component is used as a resin component. To ensure higher adhesion to the transparent conductive layer, a thermoplastic resin may be contained in the cured resin layer-1. Examples of the thermoplastic resin include cellulose derivatives such as acetyl cellulose, nitro cellulose, acetylbutyl cellulose, ethyl cellulose and methyl cellulose, vinyl-based resins such as homopolymers and copolymers of vinyl acetate, homopolymers and copolymers of vinyl chloride, and homopolymers and copolymers of vinylidene chloride, acetal resins such as polyvinyl formal and polyvinyl butyral, acrylic-based resins such as acrylic resin (including copolymers) and methacrylic resins (including copolymers), polystyrene resin, polyamide resin and polycarbonate resin.

The fine particles A used in the present invention are not limited to a particular kind if they have an average primary particle diameter of 0.5 to 5 μm. Examples of the fine particles A include $SiO_2$ fine particles, fine particles comprising $SiO_2$ as the main component or a crosslinking component and fine particles comprising a styrene-based, acrylic-based or butadiene-based polymer as the main component. The fine particles A may be surface modified fine particles. Two or more different types of the above fine particles A may be used in combination. For example, a mixture of different types of fine particles having different average primary particle diameters may be used as the fine particles A so as to obtain a wide particle size distribution to be used. The content of the fine particles A is 0.3 part or more and less than 1.0 part by weight, preferably 0.3 to 0.9 part by weight, more preferably 0.3 to 0.8 part by weight based on 100 parts by weight of the curable resin component. When the content is lower than 0.3 part by weight, the anti-Newton rings function becomes unsatisfactory although the haze value can be reduced to improve the visibility of a transparent touch panel. When the content is 1.0 part or more by weight, the anti-Newton rings function becomes superior but the haze value increases. Therefore, when the transparent touch panel is mounted on a display, image and character information on the display gets blurred disadvantageously.

The super fine particles C having an average primary particle diameter of 100 nm or less are made of a metal oxide or a metal fluoride. Examples of the metal oxide and metal fluoride include $Al_2O_3$, $Bi_2O_3$, $CeO_2$, $In_2O_3$, $(In_2O_3SnO_2)$, $HfO_2$, $La_2O_3$, $MgF_2$, $Sb_2O_5$, $(Sb_2O_5.SnO_2)$, $SiO_2$, $SnO_2$, $TiO_2$, $Y_2O_3$, ZnO and $ZrO_2$. They may be used alone or in combination of two or more. As a matter of course, a metal oxide and a metal fluoride may be used in combination. When the refractive index of the super fine particles C is higher than the refractive index of the curable resin component, the obtained cured resin layer-1 tends to have a large haze value. Therefore, super fine particles having a lower refractive index are preferred as the super fine particles C because the choice of the curable resin component becomes wider. $SiO_2$ and $MgF_2$ super fine particles are preferred as the super fine particles C. Since agglomeration readily occurs because these super fine particles C have a very large specific surface area, they can be often acquired as a slurry by adding a dispersant to disperse them in a solvent. Examples of the dispersant include fatty acid amines, sulfuric acid amines, $\epsilon$-caprolactones, hydrostearic acids, polycarboxylic acids and polyester amines. Examples of the dispersion medium (solvent) include commonly used solvents such as alcohols, water, ketones and aromatic solvents.

It is one of important points which form the basis of the present invention that the super fine particles C should level the cured resin layer. To this end, the super fine particles C must be dispersed in such a manner that secondary agglomeration does not occur. Although the super fine particles C may form agglomerate according to manufacturing conditions, agglomerated fine particles are not suitable as the super fine particles C. It is preferred that the super fine particles C should be dispersed and should not form a secondary agglomerate having a long diameter of 1 μm or more. This state can be confirmed by observation in the same manner as in the method of measuring the average primary particle diameter using a transmission electron microscope which will be described hereinafter.

The average primary particle diameter of the super fine particles C must be 100 nm or less to prevent the whitening of the cured resin layer caused by the occurrence of internal haze. The average primary particle diameter of the super fine particles C is preferably 80 nm or less, more preferably 60 nm or less. The lower limit of the average primary particle diameter is not particularly limited but preferably 5 nm. The average primary particle diameter of the super fine particles C can be measured by using a laser diffraction scattering type particle size distribution measuring instrument. For the simple measurement of the particle diameter, a transmission electron microscope may be used to measure the actual size of each particle. Stated more specifically, after the cured resin layer containing the super fine particles C is embedded in an epoxy resin and the epoxy resin layer is completely cured, the resulting cured resin layer is sliced with a microtome to preparer a measurement sample which is then observed through a transmission electron microscope. The sizes of 10 or more super fine particles C are measured at random and the measurement values are averaged to obtain the average primary particle diameter.

The content of the super fine particles C dispersed in the cured resin layer-1 is 1 to 20 parts by weight, preferably 2 to 10 parts by weight, more preferably 3 to 7 parts by weight based on 100 parts by weight of the curable resin component. When the content of the super fine particles C is lower than 1 part by weight, their effect of leveling the cured resin layer-1 becomes unsatisfactory with the result that the surface roughness increases and sparkling occurs by the cured resin layer-1 disadvantageously. When the content of the super fine particles C is higher than 20 parts by weight, the cured resin layer-1 is leveled too much with the result that the surface roughness decreases. Consequently, the obtained layer is not suitable as the anti-Newton rings layer of a transparent electrode substrate for use in a transparent touch panel.

In order to form the cured resin layer-1 which is free from the occurrence of sparkling and has an anti-Newton rings function, it is very important to control the thickness of the cured resin layer-1. Further, to form irregularities on the cured resin layer-1, the thickness of the cured resin layer-1 is desirably smaller than the average primary particle diameter of the contained fine particles A. The thickness of the uneven cured resin layer-1 is 0.5 to 5.0 μm, preferably 1.0 to 4.0 μm, more preferably 1.5 to 3.0 μm. When the thickness is smaller than 0.5 μm, the mechanical strength of the anti-Newton rings layer becomes low, thereby making the layer unsuitable for use in a transparent electrode substrate for a transparent touch panel. When the thickness is larger than 5.0 μm, fine particles having an average primary particle diameter larger than 5 μm must be used to form irregularities on the surface of the cured resin layer-1. Therefore, the haze value of the cured resin layer-1 is increased by the fine large particles, thereby deteriorating the visibility of a display.

The 10-point average roughness (Rz) defined by JIS B0601-1982 of the cured resin layer-1 is preferably 100 nm or more and less than 1,000 nm, more preferably 100 nm or more and less than 800 nm, much more preferably 150 nm or more and less than 500 nm. When the 10-point average roughness (Rz) is less than 100 nm, "Newton rings" may readily occur between the movable electrode substrate and the fixed electrode substrate of a transparent touch panel. When the 10-point average roughness (Rz) is 1,000 nm or more, the haze value becomes large, which is not preferred because sparkling occurs due to the color separation of pixels when a transparent touch panel is mounted on a high-definition display.

The arithmetic average roughness (Ra) defined by JIS B0601-1994 of the cured resin layer-1 is preferably 50 nm or more and less than 500 nm, more preferably 50 nm or more and less than 400 nm, much more preferably 50 nm or more and less than 300 nm, particularly preferably 60 nm or more and less than 200 nm. When the arithmetic average roughness (Ra) is less than 50 nm, "Newton rings" may readily occur between the movable electrode substrate and the fixed electrode substrate of a transparent touch panel.

The haze value defined by JIS K7136 based on the uneven cured resin layer-1 and the transparent polymer substrate is 1% or more and less than 8%, preferably 1% or more and less than 5%, more preferably 1% or more and less than 3%. When the haze value is less than 1%, "Newton rings" may readily occur between the movable electrode substrate and the fixed electrode substrate of a transparent touch panel disadvantageously. When the haze value is 8% or more, image and character information gets blurred when the transparent touch panel is mounted on a display.

As the method of forming the uneven cured resin layer-1 in the present invention, it is preferably formed by coating. In this case, almost all kinds of known coating means such as doctor knife, bar coater, gravure roll coater, curtain coater, knife coater, spin coater, spray and immersion may be used.

Stated more specifically, a dispersion of the fine particles A, a dispersion of the super fine particles C and a reaction initiator are added to a monomer (solution) or oligomer (solution) of a curable resin, and a solvent is optionally added to adjust the viscosity of the resulting solution. This solution composition is applied to the surface of the transparent polymer substrate by using one of the above coating means and exposed to heat or light to react and cure the resin so as to form a cured resin layer.

The transparent polymer substrate used in the present invention is preferably a thermoplastic or thermosetting polymer film having excellent transparency. The polymer is not particularly limited if it is a transparent polymer having excellent heat resistance. Examples of the polymer include polyester resins such as polyethylene terephthalate, polyethylene-2,6-naphthalate and polydiallyl phthalate, polycarbonate resins, polyether sulfone resins, polysulfone resins, polyarylate resins, acrylic resins, cellulose acetate resins and amorphous polyolfins. As a matter of course, they may be used as a homopolymer or a copolymer, or alone or in combination. The transparent polymer substrate is advantageously molded by commonly used melt extrusion or solution casting, and the molded transparent polymer film is optionally stretched monoaxially or biaxially to enhance its mechanical strength or optical function.

When the transparent conductive laminate of the present invention is used as the movable electrode substrate of a transparent touch panel, it is preferably a film having a thickness of 75 to 400 μm as a substrate from the viewpoint of strength for retaining flexibility and flatness for operating the transparent touch panel as a switch.

When the transparent conductive laminate of the present invention is used as the movable electrode substrate of a transparent touch panel, a transparent conductive laminate consisting of the above polymer film substrate, a glass substrate or a laminate substrate of these substrates and a transparent conductive layer may be used as a fixed electrode substrate. The thickness of the fixed electrode substrate which consists of a single layer or multiple layers is preferably 0.4 to 4.0 mm from the viewpoints of the strength and weight of a transparent touch panel.

When the transparent conductive laminate of the present invention is used as the fixed electrode substrate of a transparent touch panel, a sheet having a thickness of 0.4 to 4.0 mm is preferred from the viewpoints of strength for retaining flatness. However, a laminate having a total thickness of 0.4 to 4.0 mm and consisting of a film having a thickness of 50 to 400 μm and another sheet may be used. Or, a film having a thickness of 50 to 400 μm may be affixed to the surface of a display.

A new transparent touch panel comprising a polarizer or a laminate consisting of a polarizer and a phase difference film on the input side (user side) has recently been developed. An advantage obtained by this structure is that the contrast of a display can be improved by reducing the reflectance of extraneous light in the inside of the transparent touch panel mainly by the optical function of the above polarizer or the polarizer and the phase difference film to 50% or less when the transparent touch panel is mounted.

Since polarization passes through the transparent conductive laminate in this type of transparent touch panel, a transparent polymer film having excellent optical isotropy is preferably used as the transparent polymer film. Specifically, when the refractive index in the lag axial direction of the substrate is represented by nx, the refractive index in the leading axial direction of the substrate is represented by ny and the thickness of the substrate is represented by d (nm), the in-plane retardation value Re obtained by the equation $Re=(nx-ny)\cdot d(nm)$ is preferably at least 30 nm, more preferably 20 nm or less, much more preferably 10 nm or less, particularly preferably 5 nm or less. It is ideally 0 nm. The in-plane retardation value of the substrate is a value measured by a spectroscopic ellipsometer (M150 of Nippon Bunko Co., Ltd.) at a wavelength of 590 nm.

In the application of the above transparent touch panel in which polarization passes through the transparent conductive laminate, the in-plane retardation value of the transparent electrode substrate is extremely important. Besides this, the 3-D refractive index of the transparent electrode substrate, that is, a K value obtained by the equation $K=\{(nx+ny)/2-nz\}\cdot d$ when the refractive index in the thickness direction of the substrate is represented by nz is preferably −250 to +150 nm, more preferably −200 to +130 nm, much more preferably −100 to +100 nm, particularly preferably −50 to +50 nm so as to obtain the excellent angle of visibility of the transparent touch panel. It is ideally 0 nm.

As a transparent polymer substrate showing excellent optical isotropy, molded substrates obtained by molding a polycarbonate, amorphous polyarylate, polyether sulfone, polysulfone, triacetyl cellulose, diacetyl cellulose, cycloolefin polymer, a modified product thereof or a copolymer with another material into a film, substrates molded out of a thermosetting resin such as an epoxy resin and molded substrates obtained by molding an ultraviolet curable resin such as acrylic resin into a film or sheet are particularly preferred. Substrates molded out of a polycarbonate, amorphous polyarylate, polyether sulfone, polysulfone, cycloolefin polymer, a modified product thereof or a copolymer with another material are most preferred from view points of moldability, costs for preparation or thermal stability.

More specifically, the polycarbonate is, for example, a homopolymer or copolymer of at least one component selected from the group consisting of bisphenol A, 1,1-di(4-phenol)cyclohexylidene, 3,3,5-trimethyl-1,1-di(4-phenol) cyclohexylidene, fluorene-9,9-di(4-phenol) and fluorene-9, 9-di(3-methyl-4-phenol) as a monomer unit, or a mixture thereof. Substrates molded out of a polycarbonate having an average molecular weight of about 15,000 to 100,000 (for example as available polycarbonate, Panlite of Teijin Chemicals Ltd. or Apec HT of Bayer AG), out of these polycarbonates, are preferred.

Substrates molded out of amorphous polyarylate are available on the market such as Elmek of Kaneka Corporation (previously Kanegafuchi Chemical Industry Co., Ltd.), U polymer of Unitika Ltd., and Isalyl of Isonova Co., Ltd.

Substrates molded out of a cycloolefin polymer are available on the market such as Zeonoa of Nippon Zeon Co., Ltd. and Arton of JSR Corporation.

Examples of the method of manufacturing substrates molded out of these polymer compounds include melt extrusion, solution casting and injection molding. Melt extrusion and solution casting are preferred because excellent isotropy can be obtained.

In the present invention, the transparent conductive layer is formed on the uneven cured resin layer-1 directly or through a cured resin layer-2 or an optical interference layer. The mechanical properties such as writing durability of the transparent conductive laminate can be improved by forming the transparent conductive layer through the above cured resin layer-2. As the transparent conductive layer may be used an ITO layer containing 2 to 20 wt % of tin oxide or a tin oxide layer doped with antimony or fluorine. To form the transparent conductive layer, sputtering, vacuum deposition, PVD (Physical Vapor Deposition) such as ion plating, coating, printing or CVD (Chemical Vapor Deposition) may be employed. Out of these, PVD and CVD are preferred. In the case of PVD or CVD, the thickness of the transparent conductive layer is preferably 5 to 50 nm, more preferably 10 to 30 nm from the viewpoints of transparency and conductivity. When the thickness of the transparent conductive layer is smaller than 5 nm, the time stability of a resistance value tends to deteriorate and when the thickness is larger than 50 nm, the transmittance of the transparent conductive laminate lowers disadvantageously. A transparent conductive layer having a surface resistance of preferably 100 to 2,000 $\Omega/\square$ ($\Omega$/Sq), more preferably 140 to 2,000 $\Omega/\square$ ($\Omega$/Sq) when it is as thick as 10 to 30 nm is preferably used to reduce the consumption power of the transparent touch panel and from the need for circuit processing.

Further, the transparent conductive layer is preferably a crystalline film comprising indium oxide as the main component, particularly preferably a layer of crystalline ITO. The crystal particle size of indium oxide is preferably 3,000 nm or less. When the crystal particle size is larger than 3,000 nm, the writing durability deteriorates disadvantageously. The term "crystal particle size" as used herein is defined as the largest diagonal line or diameter of a polygonal or elliptic area observed through a transmission electron microscope (TEM).

In the present invention, the expression "comprising indium oxide as the main component" means indium oxide containing tin, tellurium, cadmium, molybdenum, tungsten, fluorine or zinc as a dopant, or indium oxide containing silicon, titanium or zinc as a dopant, in addition to tin.

The expression "crystalline film" means that the crystal phase accounts for 50% or more, preferably 75% or more, more preferably 95% or more, particularly preferably almost 100% of a layer made of indium oxide containing a dopant.

In the present invention, the cured resin layer-2 may be formed between the uneven cured resin layer-1 and the transparent conductive layer to improve optical properties such as total light transmittance as described above. The cured resin layer-2 can be formed in the same manner as the above cured resin layer-1.

The resin used to form the cured resin layer-2 is an ionizing radiation curable resin or a thermosetting resin. Examples of the ionizing radiation curable resin include monofunctional and polyfunctional acrylate-based ionizing radiation curable resins such as polyol acrylate, polyester acrylate, urethane acrylate, epoxy acrylate, modified styrene acrylate, melamine acrylate and silicon-containing acrylate.

Examples of the thermosetting resin include organosilane-based thermosetting resins (alkoxysilanes) such as methyltriethoxysilane and phenyltriethoxysilane, melamine-based thermosetting resins such as etherified methylolmelamine, isocyanate-based thermosetting resins, phenol-based thermosetting resins and epoxy-based thermosetting resins. These thermosetting resins may be used alone or in combination. A thermoplastic resin may be mixed as required. To crosslink the resin layer by heat, a known reaction accelerator or a curing agent is added in a suitable amount. Examples of the reaction accelerator include triethylenediamine, dibutyltin dilaurate, benzylmethylamine and pyridine. Examples of the curing agent include methylhexahydrophthalic anhydride, 4,4'-diaminodiphenylmetahne, 4,4'-diamino-3,3'-diethyldiphenylmethane and diaminodiphenylsulfone.

The cured resin layer-2 is formed by hydrolyzing and condensation polymerizing the above alkoxysilane. Examples of the alkoxysilane include tetramethoxysilane, tetraethoxysilane, methyltrimethoxysilane, methyltriethoxysilane, dimethyldimethoxysilane, γ-glycidoxypropyltrimethoxysilane, β-(3,4-epoxycyclohexyl)ethyltrimethoxysilane, vinyltrimethoxysilane, N-β(aminoethyl)γ-aminopropyltrimethoxysilane, N-β(aminoethyl)γ-aminopropyldimethoxysilane and γ-aminopropyltriethoxysilane.

These alkoxysilanes are preferably used in combination of two or more from the viewpoints of the mechanical strength, adhesion and solvent resistance of the layer. An alkoxysilane having an amino group in the molecule is preferably contained in an amount of 0.5 to 40% of the total of alkoxysilanes from the viewpoint of solvent resistance.

The alkoxysilane may be used as a monomer or an oligomer by carrying out hydrolysis and dehydration condensation. In general, it is dissolved in a suitable organic solvent to prepare a diluted coating solution which is applied to the substrate. The hydrolysis of the coating film formed on the substrate proceeds by water contained in air and then the crosslinking of the film proceeds by dehydration condensation.

In general, a suitable heat treatment is required for the promotion of crosslinking. The heat treatment is preferably carried out at a temperature of 100° C. or higher for several minutes or longer in the coating step. As the case may be, activation radiation such as ultraviolet radiation is applied to the coating film simultaneously with the above heat treatment to further increase the degree of crosslinking.

The dilution solvent is, for example, an alcohol-based or hydrocarbon-based solvent. Preferred examples of the solvent include ethanol, isopropyl alcohol, butanol, 1-methoxy-2-propanol, hexane, cyclohexane and ligroin. Besides these, a polar solvent such as xylene, toluene, cyclohexanone, methylisobutyl ketone or isobutyl acetate may be used. These solvents may be used alone or in combination of two or more.

To adjust the refractive index of the cured resin layer-2, super fine particles C of a metal oxide or a metal fluoride having an average primary particle diameter of 100 nm or less and a fluorine-based resin may be contained in the cured resin layer-2 alone or in combination of two or more. The refractive index of the cured resin layer-2 is preferably lower than the refractive index of the cured resin layer-1 and 1.20 to 1.55, more preferably 1.20 to 1.45. The thickness of the cured resin layer-2 is preferably 0.05 to 0.5 μm, more preferably 0.05 to 0.3 μm.

The average primary particle diameter of the super fine particles C is preferably 100 nm or less, more preferably 50 nm or less. The cured resin layer-2 which is not whitened can be formed by controlling the primary particle diameter of the super fine particles C to 100 nm or less.

Examples of the super fine particles C include $Bi_2O_3$, $CeO_2$, $In_2O_3$, ($In_2O_3.SnO_2$), $HfO_2$, $La_2O_3$, $MgF_2$, $Sb_2O_5$, ($Sb_2O_5.SnO_2$), $SiO_2$, $SnO_2$, $TiO_2$, $Y_2O_3$, $ZnO$ and $ZrO_2$ super fine particles. Out of these, super fine particles of a metal oxide or a metal fluoride having a refractive index of 1.55 or less such as $MgF_2$ or $SiO_2$ are preferred.

The content of the super fine particles C is preferably 10 to 400 parts by weight, more preferably 30 to 400 parts by weight, much more preferably 50 to 300 parts by weight based on 100 parts by weight of the thermosetting resin and/or ionizing radiation curable resin. When the content of the super fine particles C is higher than 400 parts by weight, the strength and adhesion of the layer may become unsatisfactory. When the content of the super fine particles C is lower than 10 parts by weight, a predetermined refractive index may not be obtained.

The fluorine-based resin is a polymer containing 5 to 70 wt % of monomer units having a fluorine atom, such as vinylidene fluoride, hexafluoropropylene, tetrafluoroethylene, fluoroethylene, trifluoroethylene, chlorotrifluoroethylene, 1,2-dichloro-1,2-difluoroethylene, 2-bromo-3,3,3-trifluoroethylene, 3-bromo-3,3-difluoropropylene, 3,3,3-trifluoropropylene, 1,1,2-trichloro-3,3,3-trifluoropropylene or α-trifluoromethacrylic acid.

The content of the fluorine-based resin is preferably 50 to 300 parts by weight, more preferably 100 to 300 parts by weight, much more preferably 150 to 250 parts by weight based on 100 parts by weight of the thermosetting resin and/or ionizing radiation curable resin. When the content of the fluorine-based resin is higher than 300 parts by weight, the strength and adhesion of the layer may become unsatisfactory and when the content of the fluorine-based resin is lower than 50 parts by weight, a predetermined refractive index may not be obtained.

In the present invention, the optical interference layer may be formed between the uneven cured resin layer-1 and the transparent conductive layer to control the refractive index and improve transparency as described above.

The optical interference layer used in the present invention preferably consists of at least one high-refractive index layer and at least one low-refractive index layer. Two or more sets of the high-refractive index layer and the low-refractive index layer may be used. When the optical interference layer consists of one high-refractive index layer and one low-refractive index layer, the thickness of the optical interference layer is preferably 30 to 300 nm, more preferably 50 to 200 nm.

The high-refractive index layer constituting the optical interference layer of the present invention is mainly formed by hydrolyzing and condensation polymerizing a metal alkoxide. Examples of the metal alkoxide include titanium alkoxides and zirconium alkoxides.

The titanium alkoxides include titanium tetraisopropoxide, tetra-n-propyl orthotitanate, titanium tetra-n-butoxide and tetrakis(2-ethylhexyloxy)titanate.

The zirconium alkoxides include zirconium tetraisopropoxide and zirconium tetra-n-butoxide.

To control the refractive index by adding metal oxide super fine particles C which will be described hereinafter, an alkoxysilane may be used as the metal alkoxide.

A single type or two or more different types of super fine particles C having an average primary particle diameter of 100 nm or less and made of the above metal oxide or metal fluoride may be contained in the high-refractive index layer in a suitable amount. The refractive index of the high-refractive index layer can be adjusted by adding the super fine particles C.

When the super fine particles C are added to the high-refractive index layer, the weight ratio of the super fine particles C to the metal alkoxide is preferably 0:100 to 60:40, more preferably 0:100 to 40:60. When the weight ratio of the super fine particles C to the metal alkoxide is higher than 60:40, strength and adhesion required for the optical interference layer may become unsatisfactory.

The thickness of the high-refractive index layer is preferably 15 to 250 nm, more preferably 30 to 150 nm.

The refractive index of the high-refractive index layer is higher than the refractive indices of the low-refractive index layer which will be described hereinafter and the cured resin layer-2, and the difference between them is preferably 0.2 or more.

A similar layer to the above cured resin layer-2 may be used as the low-refractive index layer constituting the optical interference layer of the present invention. The thickness of the low-refractive index layer is preferably 15 to 250 nm, more preferably 30 to 150 nm.

When the transparent conductive laminate of the present invention is used as the movable electrode substrate, a hard coat layer is preferably formed on the surface to which external force is applied, that is, the surface of the transparent organic polymer substrate opposite to the transparent conductive layer when it is used in a transparent touch panel. Examples of the material of the hard coat layer include organosilane-based thermosetting resins such as methyltriethoxysilane and phenyltriethoxysilane, melamine-based thermosetting resins such as etherified methylolmelamine, and polyfunctional acrylate-based ultraviolet radiation curable resins such as polyol acrylate, polyester acrylate, urethane acrylate and epoxy acrylate. Mixtures of these thermosetting resins and fine particles such as $SiO_2$ and $MgF_2$ may be used as required. The fine particles are uniformly dispersed in the hard coat layer. The thickness of the hard coat layer is preferably 2 to 5 μm from the viewpoints of flexibility and abrasion resistance.

The hard coat layer may be formed by coating. As for actual coating, a coating solution prepared by dissolving the above compound in an organic solvent to adjust its concentration and viscosity is applied to the transparent organic polymer film and the obtained coating film is cured by applying radiation or heating. Coating techniques such as microgravure coating, Meyer bar coating, direct gravure coating, reverse roll coating, curtain coating, spray coating, comma coating, die coating, knife coating and spinner coating may be employed.

The hard coat layer is formed on the transparent polymer substrate directly or through a suitable anchor layer. The anchor layer is preferably a layer having the function of improving adhesion between the hard coat layer and the transparent organic polymer substrate, a phase correction layer such as a layer having 3-D refractive index characteristics to ensure that the K value becomes negative, a layer having the function of preventing the transmission of water or air or the function of absorbing water or air, or a layer having the function of absorbing ultraviolet radiation or infrared radiation or the function of suppressing the electrification of the substrate.

A cured resin layer-3 having an anti-glare function may be used as the hard coat layer.

In general, an anti-glare function can be provided by roughening the surface of the hard coat layer. To roughen the surface of the hard coat layer, at least one type of fine particles having an average primary particle diameter of 0.001 to 5.0 μm are contained in a resin component for forming the hard coat layer, or super fine particles C having an average primary particle diameter of 100 nm or less are contained in a resin component for forming the hard coat layer in such a manner that they form agglomerates as large as 1.0 μm or less.

When the cured resin layer-3 having an anti-glare function is used as the hard coat layer, the haze value of the transparent conductive laminate becomes large. If the haze value is within the limits of attaining the object of the present invention, it may be used. In this case, the haze value defined by JIS K7136 based on the transparent polymer substrate, the cured resin layer-1 and the cured resin layer-3 is preferably 4% or more and less than 18%, more preferably 4% or more and less than 15%, particularly preferably 4% or more and less than 12%.

EXAMPLES

The following examples are provided for the purpose of further illustrating the present invention but are in no way to be taken as limiting. "Parts" and "%" in the examples are based on weight unless stated otherwise. Measurements in the examples were made as follows.

Arithmetic average roughness (Ra): measured by using the DEKTAK3 tracer level difference meter of Sloan Co., Ltd. in accordance with JIS B0601-1994.

10-point average roughness (Rz): measured by using the Surfcorder SE-3400 of Kosaka Kenkyusho Co., Ltd. in accordance with JIS B0601-1982.

Haze value: measured by using the MDH2000 haze meter of Nippon Denshoku Co., Ltd.

evaluation of anti-sparkling properties: A transparent touch panel was mounted on an about 123 dpi liquid crystal display (diagonal: 10.4 inches, XGA (1024×768 dots)) to check the existence of sparkling visually. When sparkling was not observed, the transparent touch panel was evaluated as acceptable and when sparkling was observed, the transparent touch panel was evaluated as defective.

Evaluation of anti-Newton rings properties: The existence of "Newton rings" in an area where a movable electrode substrate and a fixed electrode substrate were brought into contact with each other at 60° from the surface (vertical direction of 0°) of a transparent touch panel under a 3-wavelength fluorescent lamp was checked visually. When "Newton rings" was not observed, the transparent touch panel was evaluated as acceptable and when "Newton rings" was observed, the touch panel was evaluated as defective. Evaluation of leveling state of cured resin layer-1: The leveling state of a resin was observed through the 1LM21D laser microscope of Laser Tech Co., Ltd.

Example 1

100 parts by weight of the Aronix M405 tetrafunctional acrylate (of Toagosei Chemical Industry Co., Ltd.), 5 parts by weight of Irgacure 184 (of Chiba Specialty Chemicals Co., Ltd.) and 0.7 part by weight of Hipresica (3.0 μm product, grade of N3N) of Ube-Nitto Kasei Co., Ltd. were dissolved in a 1:1 mixed solvent of isopropyl alcohol and 1-methoxy-2-propanol to prepare a coating solution A. The coating solution A and $MgF_2$ fine particles having an average primary particle diameter of 30 nm (of CI Kasei Co., Ltd., dispersion containing 20 wt % of a mixed solvent of ethyl alcohol and n-butyl alcohol) were mixed with 100 parts by weight of a curable resin component to prepare a coating solution B having a solid content of 5 parts by weight.

Figure 1:
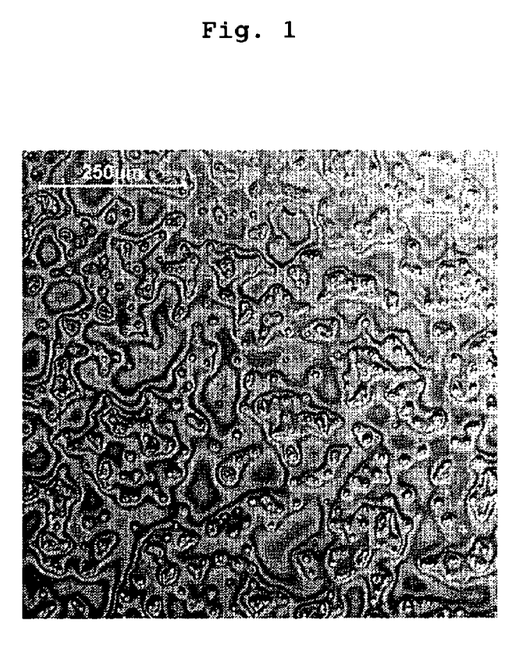
FIG. 1 is a laser photomicrograph of the surface of a cured resin layer-1 in Example 1.
Figure 2:
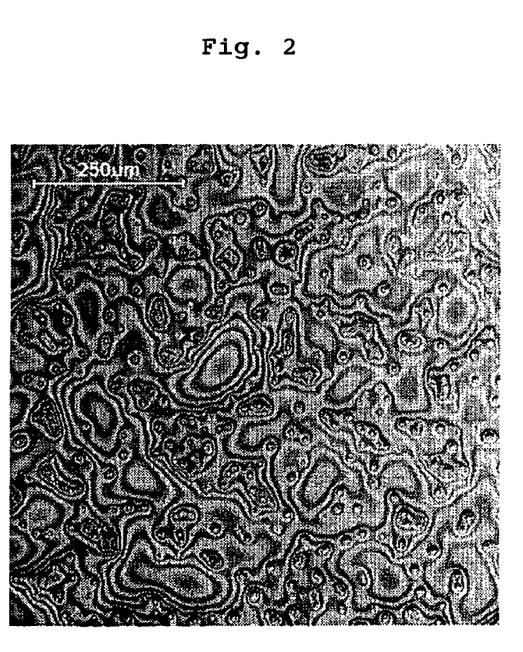
FIG. 2 is a laser photomicrograph of the surface of a cured resin layer-1 in Comparative Example 1.
Figure 3:
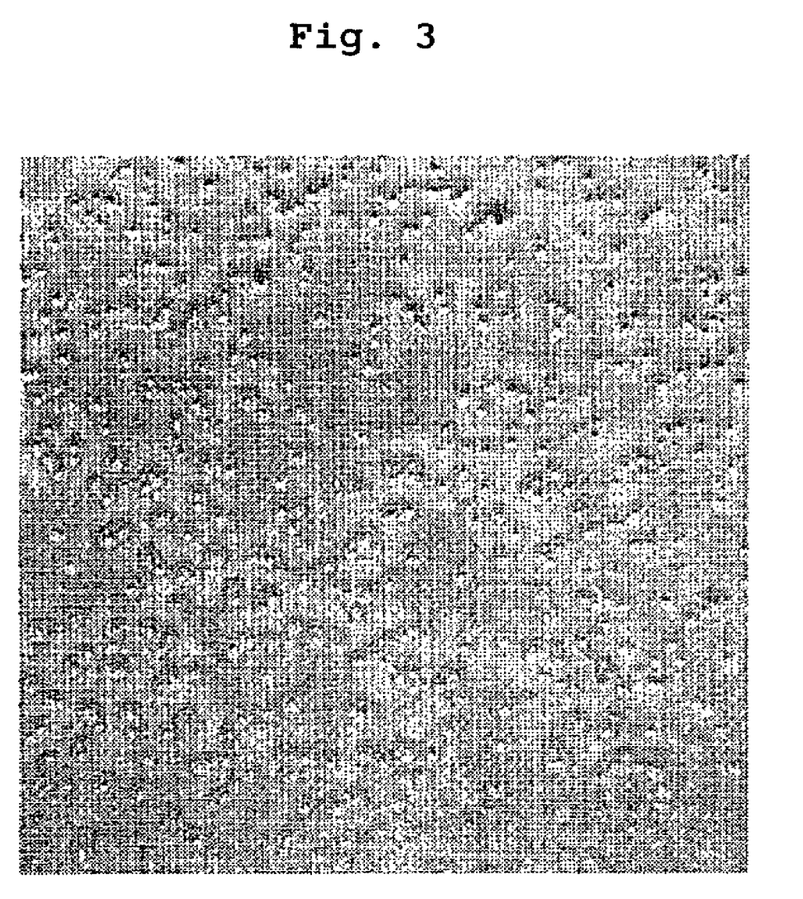
FIG. 3 is a laser photomicrograph of the surface of a cured resin layer-1 in Comparative Example 2.

The coating solution B was applied to one side of a polyethylene terephthalate film (OFW-188 of Teijin Du Pont Film Co., Ltd.) on a transparent polymer substrate to a thickness of 2.5 μm after curing with a bar coater, dried at 50° C. for 1 minute, and cured by applying ultraviolet radiation to form an uneven cured resin layer-1. A laser photomicrograph of the surface of the cured resin layer-1 is shown in FIG. 1. When the leveling of FIG. 1 is compared with those of FIG. 2 of Comparative Example 1 and FIG. 3 of Comparative Example 2 which will be described hereinafter, it is understood that the leveling of FIG. 2 is unsatisfactory and the leveling of FIG. 3 is excessive. That is, FIG. 1 shows that interference fringes representing the degree of unevenness draw rings of a suitable size, which means that the leveling state is suitable.

A hard coat layer 1 as thick as 4 μm was formed from a ultraviolet radiation curable polyfunctional acrylate resin coating on the surface opposite to the cured resin layer-1 formed surface.

Thereafter, γ-glycidoxypropyltrimethoxysilane (KBM403 of Shin-Etsu Chemical Co., Ltd.) and methyltrimethoxysilane (KBM13 of Shin-Etsu Chemical Co., Ltd.) were mixed together in a molar ratio of 1:1 and the hydrolysis of the above alkoxysilanes was carried out with an aqueous solution of acetic acid (pH=3.0) in accordance with a known method to obtain an alkoxysilane hydrolyzate 1. 1 part by weight in terms of solid content of N-β(aminoethyl)γ-aminopropylmethoxysilane (KBM603 of Shin-Etsu Chemical Co., Ltd.) was added to 20 parts by weight in terms of solid content of the above alkoxysilane hydrolyzate 1, and the resulting mixture was diluted with a mixture solution of isopropyl alcohol and n-butanol to prepare an alkoxysilane coating solution C.

The alkoxysilane coating solution C was applied to the above cured resin layer-1 with a bar coater and baked at 130° C. for 2 minutes to form a cured resin layer-2. Further, an ITO layer was formed on this cured resin layer-2 by sputtering using an indium oxide-tin oxide target comprising indium oxide and tin oxide in a weight ratio of 95:5 and having a bulk density of 98% so as to manufacture a transparent conductive laminate which can be a movable electrode substrate. The formed ITO layer had a thickness of about 20 nm and a surface resistance of about 350Ω/□ (Ω/sq) right after manufacture. The manufactured movable electrode substrate was heated at 150° C. for 90 minutes to crystallize the ITO layer. The surface resistance value of the crystallized ITO layer was about 280 Ω/□ (Ω/sq). The measurement results of the haze value, Ra and Rz of the transparent conductive laminate are shown in Table 1.

Meanwhile, both surfaces of a 1.1 mm-thick glass sheet was coated with $SiO_2$ by dipping and a 18 nm-thick ITO layer was formed on the both surfaces of the glass sheet by sputtering. Thereafter, a dot spacer having a height of 7 μm, diameter of 70 μm and a pitch of 1.5 mm was formed on the ITO layers to manufacture a fixed electrode substrate. The manufactured fixed electrode substrate and the above transparent conductive laminate as a movable electrode substrate were used to manufacture a transparent touch panel. The evaluation results of the anti-sparkling and anti-Newton rings properties of the manufactured transparent touch panel are shown in Table 1.

Example 2

A transparent conductive laminate and a transparent touch panel were manufactured in the same manner as in Example 1 except that 0.2 part by weight of the Hypresica of Ube Nitto Kasei Co., Ltd. (2.0 μm product, grade of N3N) was added to the coating solution A of Example 1. The measurement results of the haze value, Ra and Rz of the transparent conductive laminate and the evaluation results of the anti-sparkling and anti-Newton rings properties of the transparent touch panel are shown in Table 1.

Example 3

A transparent conductive laminate and a transparent touch panel were manufactured in the same manner as in Example 1 except that the transparent polymer substrate of Example 1 was changed to the Zeonoa (ZF14-100) of Nippon Zeon Co., Ltd. The measurement results of the haze value, Ra and Rz of the transparent conductive laminate and the evaluation results of the anti-sparkling and anti-Newton rings properties of the transparent touch panel are shown in Table 1.

Example 4

A transparent conductive laminate and a transparent touch panel were manufactured in the same manner as in Example 1 except that the transparent polymer substrate of Example 1 was changed to the polycarbonate film (Pure Ace C110-100)

of Teijin Chemicals Ltd. The measurement results of the haze value, Ra and Rz of the transparent conductive laminate and the evaluation results of the anti-sparkling and anti-Newton rings properties of the transparent touch panel are shown in Table 1.

Comparative Example 1

A cured resin layer-1 was formed by using the coating solution A in place of the coating solution B of Example 1. A laser microphotograph of the manufactured cured resin layer-1 is shown in FIG. 2. Compared with FIG. 1 of Example 1, the leveling of the cured resin layer-1 is unsatisfactory and interference fringes representing the degree of unevenness are striking. Subsequently, a transparent conductive laminate and a transparent touch panel were manufactured in the same manner as in Example 1 except for the cured resin layer-1.

The measurement results of the haze value, Ra and Rz of the transparent conductive laminate and the evaluation results of the anti-sparkling and anti-Newton rings properties of the transparent touch panel are shown in Table 1.

Comparative Example 2

A cured resin layer-1 was formed by using a coating solution B prepared by mixing 20 parts by weight of $MgF_2$ fine particles based on 100 parts by weight of the curable resin component in place of the coating solution B of Example 1. A laser microphotograph of the manufactured cured resin layer-1 is shown in FIG. 3. Compared with FIG. 1 of Example 1, the cured resin layer-1 levels out too much. No rings as interference fringes representing the degree of unevenness are seen.

Subsequently, a transparent conductive laminate and a transparent touch panel were manufactured in the same manner as in Example 1 except for the cured resin layer-1. The measurement results of the haze value, Ra and Rz of the transparent conductive laminate and the evaluation results of the anti-sparkling and anti-Newton rings properties of the transparent touch panel are shown in Table 1.

Reference Example 1

A transparent laminate was manufactured in the same manner as in Example 1 except that a transparent conductive layer (ITO) was not formed. The haze value of this transparent laminate is shown in Table 1. It is understood from comparison between Example 1 and Reference Example 1 that the transparent conductive layer did not have an influence upon the haze value.

TABLE 1

|  | Ex. 1 | Ex. 2 | Ex. 3 | Ex. 4 | C. Ex. 1 | C. Ex. 2 | R.Ex. 1 |
|---|---|---|---|---|---|---|---|
| Haze value(%) | 2.2 | 2.8 | 1.1 | 1.0 | 2.5 | 2.4 | 2.2 |
| Ra(nm) | 150 | 181 | 152 | 148 | 195 | 132 | — |
| Rz(nm) | 370 | 422 | 381 | 359 | 452 | 303 | — |
| Anti-Newton rings properties | A | A | A | A | A | D | — |
| Anti-sparkling properties | A | A | A | A | D | A | — |

Ex.: Example
C.Ex.: Comparative Example
R.Ex.: Reference Example
A: Acceptable
D: Defective Sparkling can be suppressed when a transparent touch panel is mounted on a high-definition display by using the transparent conductive laminate of the present invention, thereby making it possible to improve visibility. The occurrence of "Newton rings" can be prevented. The transparent conductive laminate of the present invention is useful as the transparent electrode substrate of a transparent touch panel.

The invention claimed is:

1. A transparent conductive laminate comprising a transparent polymer substrate, a cured resin layer-1 formed on at least one side of the substrate and a transparent conductive layer formed on the cured resin layer-1 directly or through another layer, wherein
   (A) the cured resin layer-1 comprises (i) a cured resin component, (ii) at least one type of fine particles A having an average primary particle diameter of 0.5 to 5 μm and (iii) super fine particles C having an average primary particle diameter of 100 nm or less made of at least one selected from the group consisting of a metal oxide and a metal fluoride;
   (B) the content of the fine particles A in the cured resin layer-1 is 0.3 part or more by weight and less than 1.0 part by weight based on 100 parts by weight of the cured resin component (i);
   (C) the content of the super fine particles C in the cured resin layer-1 is 1 to 20 parts by weight based on 100 parts by weight of the cured resin component (i);
   (D) the thickness of the cured resin layer-1 is 0.5 to 5 μm; and
   (E) the haze value defined by JIS K7136 of the total of the transparent polymer substrate and the cured resin layer-1 is 1% or more and less than 8%,
   (F) the arithmetic average roughness (Ra) defined by JIS B0601-1994 of the cured resin layer-1 is 50 nm or more and less than 500 nm and the 10-point average roughness (Rz) defined by JIS B-0601-1982 of the cured resin layer-1 is 100 nm or more and less than 1,000 nm.

2. The transparent conductive laminate according to claim 1, wherein the cured resin layer-1 does not contain a thermoplastic resin.

3. The transparent conductive laminate according to claim 1, wherein the super fine particles C comprise at least one selected from the group consisting of $Al_2O_3$, $Bi_2O_3$, $CeO_2$, $In_2O_3$, $(In_2O_3.SnO_2)$, $HfO_2$, $La_2O_3$, $MgF_2$, $Sb_2O_5$, $(Sb_2O_5 \cdot SnO_2)$, $SiO_2$, $SnO_2$, $TiO_2$, $Y_2O_3$, ZnO and $ZrO_2$.

4. The transparent conductive laminate according to claim 1, which further has a cured resin layer-2 between the cured resin layer-1 and the transparent conductive layer, wherein the cured resin layer-2 has a refractive index of 1.20 to 1.55 and a thickness of 0.05 to 0.5 μm.

5. The transparent conductive laminate according to claim 1, which further has an optical interference layer between the cured resin layer-1 land the transparent conductive layer, wherein the optical interference layer consists of at least one low-refractive index layer and at least one high-refractive index layer and the low-refractive index layer is in contact with the transparent conductive layer.

6. The transparent conductive laminate according to claim 1, wherein the transparent conductive layer is a crystalline layer comprising indium oxide and has a thickness of 5 to 50 nm.

7. The transparent conductive laminate according to claim 1, wherein a cured resin layer-3 having an anti-glare function is formed on the surface of the transparent polymer substrate opposite to the transparent conductive layer.

8. The transparent conductive laminate according to claim 7, wherein the haze value defined by JIS K7136 of the total of the transparent polymer substrate, the cured resin layer-1 and the cured resin layer-3 is 4% or more and less than 18%.

9. A transparent touch panel comprising two transparent electrode substrates having a transparent conductive layer on at least one side, which are arranged such that the transparent conductive layers are opposed to each other, wherein
at least one of the transparent electrode substrates is the transparent conductive laminate of claim 1.

10. A transparent touch panel comprising two transparent electrode substrates having a transparent conductive layer on at least one side, which are arranged such that the transparent conductive layers are opposed to each other, wherein
at least one of the transparent electrode substrates is the transparent conductive laminate of claim 7.

* * * * *